United States Patent
Tsien et al.

(10) Patent No.: US 12,135,601 B2
(45) Date of Patent: Nov. 5, 2024

(54) DATA FABRIC C-STATE MANAGEMENT

(71) Applicants: Advanced Micro Devices, Inc., Santa Clara, CA (US); ATI Technologies ULC, Markham (CA)

(72) Inventors: Benjamin Tsien, Fremont, CA (US); Alexander J. Branover, Chestnut Hill, MA (US); Dilip Jha, Hyderabad (IN); James R. Magro, Lakeway, TX (US); MingLiang Lin, Shanghai (CN); Kostantinos Danny Christidis, Markham (CA); Hui Zhou, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/390,271

(22) Filed: Jul. 30, 2021

(65) Prior Publication Data

US 2023/0034633 A1 Feb. 2, 2023

(51) Int. Cl.
*G06F 1/00* (2006.01)
*G06F 1/3228* (2019.01)
*G06F 1/3296* (2019.01)

(52) U.S. Cl.
CPC .......... *G06F 1/3296* (2013.01); *G06F 1/3228* (2013.01)

(58) Field of Classification Search
CPC .............................. G06F 1/3296; G06F 1/3228
See application file for complete search history.

(56) References Cited

U.S. PATENT DOCUMENTS

| | | | |
|---|---|---|---|
| 6,895,520 B1 | 5/2005 | Altmejd et al. | |
| 8,862,920 B2 | 10/2014 | Branover et al. | |
| 10,775,874 B2 | 9/2020 | He et al. | |
| 2003/0105983 A1* | 6/2003 | Brakmo | G06F 1/3262 713/320 |
| 2003/0119527 A1* | 6/2003 | Labun | H04W 12/06 455/456.1 |
| 2005/0013311 A1* | 1/2005 | Samudrala | H04L 49/101 370/412 |
| 2005/0207436 A1* | 9/2005 | Varma | H04L 47/628 370/412 |

(Continued)

OTHER PUBLICATIONS

Hewlett-Packard Corporation, Intel Corporation, Microsoft Corporation, Phoenix Technologies Ltd., Toshiba Corporation; "Advanced Configuration and Power Interface Specification"; white paper; Dec. 6, 2011; Revision 5.0, 958 pages.

(Continued)

*Primary Examiner* — Mohammed H Rehman
(74) *Attorney, Agent, or Firm* — Polansky & Associates, P.L.L.C.; Paul J. Polansky

(57) ABSTRACT

A data processor includes a plurality of requestors, a plurality of responders, and a data fabric. The data fabric is for routing requests between the plurality of requestors and the plurality of responders and has a plurality of non-operational power states including a normal C-state and a light-weight C-state. The light-weight C-state has lower entry and exit latencies than the normal C-state. The data fabric monitors traffic through the data fabric and places the data fabric in the light-weight C-state in response to detecting an idle traffic state.

21 Claims, 5 Drawing Sheets

(56) References Cited

U.S. PATENT DOCUMENTS

| | | | |
|---|---|---|---|
| 2009/0223115 A1* | 9/2009 | Lang | A01M 1/14 |
| | | | 43/123 |
| 2011/0271134 A1* | 11/2011 | Hofmann | G06F 1/3215 |
| | | | 713/600 |
| 2014/0208138 A1* | 7/2014 | Homchaudhuri | |
| | | | H04W 52/0287 |
| | | | 713/320 |
| 2015/0263994 A1* | 9/2015 | Haramaty | H04L 49/3036 |
| | | | 370/412 |
| 2017/0090609 A1* | 3/2017 | Petrovic | G06F 3/04182 |
| 2017/0131928 A1* | 5/2017 | Cui | G06F 3/0665 |
| 2018/0276150 A1* | 9/2018 | Eckert | G06F 13/1642 |
| 2019/0033939 A1 | 1/2019 | Arora et al. | |
| 2019/0196978 A1* | 6/2019 | Basu | G06F 9/3887 |
| 2019/0317774 A1* | 10/2019 | Raghav | G06F 9/4403 |
| 2020/0166985 A1* | 5/2020 | He | G06F 1/3293 |
| 2020/0396158 A1* | 12/2020 | Merdler | H04L 49/3018 |
| 2021/0004466 A1* | 1/2021 | Nadarajah | G06F 8/65 |
| 2021/0200298 A1* | 7/2021 | Branover | G06F 13/1668 |
| 2021/0367905 A1* | 11/2021 | Matosevic | H04L 47/828 |
| 2022/0191070 A1* | 6/2022 | Asgaran | G06F 13/1668 |
| 2023/0195644 A1* | 6/2023 | Tsien | G06F 3/067 |
| | | | 711/118 |

OTHER PUBLICATIONS

Intel Corporation; "SA-1100 Microprocessor"; technical reference manual; Sep. 1998; 378 pages.

\* cited by examiner

| C-state | DF | UMC | PHY | DRAM | CLK |
|---|---|---|---|---|---|
| Lightweight (DFC1) | Clock gating | Clock gating | Powered on with PLL remain locked | Self refresh | PLL deep sleep |
| Traditional (DFC2) | Power and clock gating | Power and clock gating | PHY low power state with PLL off (LP2) | Self refresh | PLL power down and bypass to REFCLK |

FIG. 4

DATA FABRIC C-STATE MANAGEMENT

BACKGROUND

Computer systems utilize a variety of peripheral components for different input/output and communication functions. A system-on-chip (SOC) combines data processing circuits such as central processing unit (CPU) cores and a graphics processing unit (GPU) with peripheral controllers and memory interfaces on single integrated circuit chip and is well-suited for portable, battery-powered operation. For example, an SOC could incorporate a display controller, an image signal processor (ISP), and other peripheral controllers on the SOC to enable the input and output of information to and from the computer system. In such large and complex SOCs, the devices typically transfer data between resources such as memory by routing accesses through a large, on-chip routing circuit or "data fabric".

The diversity of the circuits on a typical SOC presents problems for implementing power-saving modes. Many of the peripheral controllers operate real-time and are isochronous, requiring a certain amount of bandwidth to shared memory resources over a certain period of time. This requirement has frustrated the implementation of chip-wide low-power states. For example, when the CPU cores and the GPU are idle, a peripheral controller may still be active and receiving data that it can store in a buffer, but must send the data to memory before the buffer fills up.

CPUs and GPUs, on the other hand, tend to have periods of high activity separated by idle periods. When the idle periods are expected to be short, the data fabric, memory controllers, and memories typically remain active so they can quickly service requests from the peripheral controllers to transfer more data.

BRIEF DESCRIPTION OF THE DRAWINGS

FIG. 4 illustrates a table showing a correspondence between different data fabric idle states and the states of other components of the SOC of FIG. 2.

Figure 1:
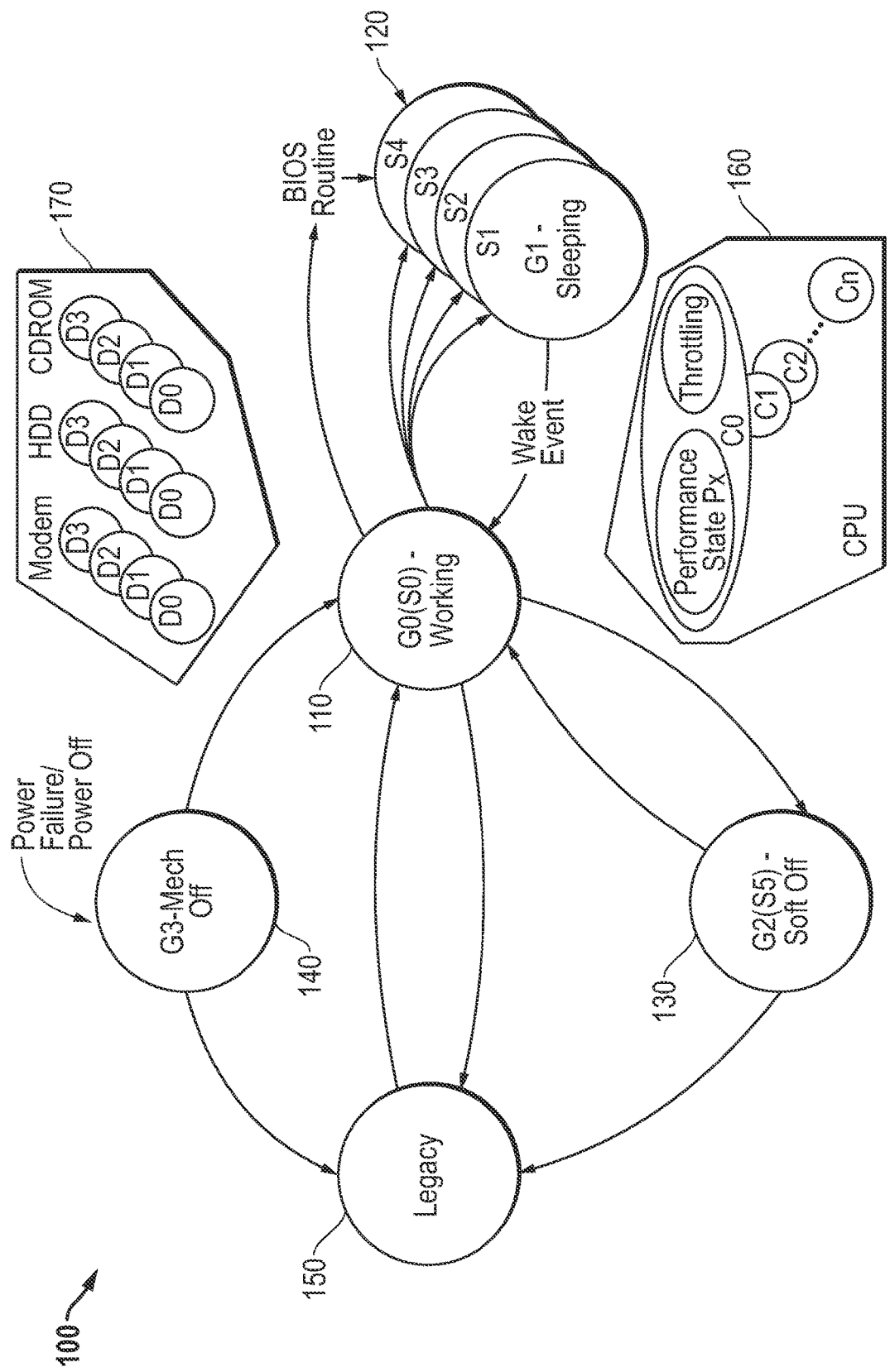
FIG. 1 illustrates in block diagram form an Advanced Configuration and Power Interface (ACPI) model for computer system power states known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processor includes a plurality of requestors, a plurality of responders, and a data fabric. The data fabric is for routing requests between the plurality of requestors and the plurality of responders, and has a plurality of non-operational power states including a normal C-state and a light-weight C-state. The light-weight C-state has lower entry and exit latencies than the normal C-state. The data fabric monitors traffic through the data fabric and places the data fabric in the light-weight C-state in response to detecting an idle traffic state.

A data processor includes a first requestor, a first responder, and a data fabric. The data fabric routes requests between the first requestor and the first responder, and has a plurality of non-operational power states including a normal C-state and a light-weight C-state. The light-weight C-state has lower entry and exit latencies than the normal C-state. The data fabric is adapted to enter the normal C-state in response to a predetermined state of the data processor. The data fabric is programmable to enter the light-weight C-state instead of the normal C-state in response to the predetermined state of the data processor.

A data processor includes at least one requestor, at least one responder, and a data fabric for routing requests between the at least one requestor and the at least one requestor. Each of the at least one requestor includes a buffer and selectively transfers data between the buffer and at least one responder through the data fabric, and has a stutter mode in which it implements a burst policy to transfer data between the buffer and one of the at least one responder in response to crossing a watermark. The data fabric includes a power management controller for controlling the data fabric to implement a plurality of non-operational power states including a normal C-state and a light-weight C-state, and disables implementing the normal C-state in response to each of the at least one requestor operating in the stutter mode.

FIG. 1 illustrates in block diagram form an Advanced Configuration and Power Interface (ACPI) model 100 for computer system power states known in the prior art. ACPI model 100 is part of the APCI Specification developed by various computer system, software, and component vendors to establish industry standard interfaces for device configuration and power management of both devices and entire computer systems.

ACPI model 100 defines a hierarchy of states of various devices in the computer system organized around a set of global system states including a G0(S0) state 110 known as the "Working" state, a G1 state 120 state known as the "Sleeping" state, a G2(S5) state 130 known as the "Soft Off" state, and a G3 state 140 known as "Mechanical Off" state. In addition, ACPI model 100 includes a state 150 known as the "Legacy" state that accommodates pre-existing basic input/output system (BIOS) power management interfaces that correspond to BIOS operation before a ACPI-compatible operating system loads. ACPI model 100 also defines a set of central processing unit (CPU) states 160, and a set of device states or "D" states 170 for devices such as modems, hard disk drives (HDDs), and compact disc read only memories (CDROMs).

ACPI model 100 is well-known and most aspects will not be discussed further. However certain aspects relating to power states of the central processing unit are relevant to understanding the present disclosure and will now be discussed.

In G0(S0) state 110, peripheral devices can have their power state changed dynamically, while the user can select, through a user interface, various performance and power characteristics of the system so that the software system can optimize the computer for the desired performance or battery life. In this state, the computer system responds to external events in real time. From the G0(S0) state, the computer system can transition to G1 state 120, which includes various power-saving sleeping states or "S-states"

under the control of system firmware such as the BIOS, and return to the working state in response to a wake event.

In G0(S0) state 110, the CPU is capable of operating in various states including a "C0" state in which the processor executes instructions, as well as various lower power or "idle" states labelled "C1" through "Cn". In the C0 state, the CPU is capable of operating in various performance states or "P-states", in which the frequency of operation can be increased or throttled to support the needs of currently-running application programs using dynamic voltage and frequency scaling (DVFS). In idle states C1-Cn, the CPU is idle and does not execute instructions but has various combinations of power consumption and wakeup latency, in which lower power consumption is traded off with longer wakeup latency. So for example, in the C1 state, power consumption is the highest but wakeup latency is the shortest, whereas in the Cn state power consumption is the lowest but wakeup latency is the longest.

Using ACPI model 100, each particular computer system may support different combinations of P-states and C-states as appropriate for the application environment. Achieving better tradeoffs between reduced power consumption and low latency in ways not specified by ACPI model 100 continues to be a desirable goal.

Figure 2:
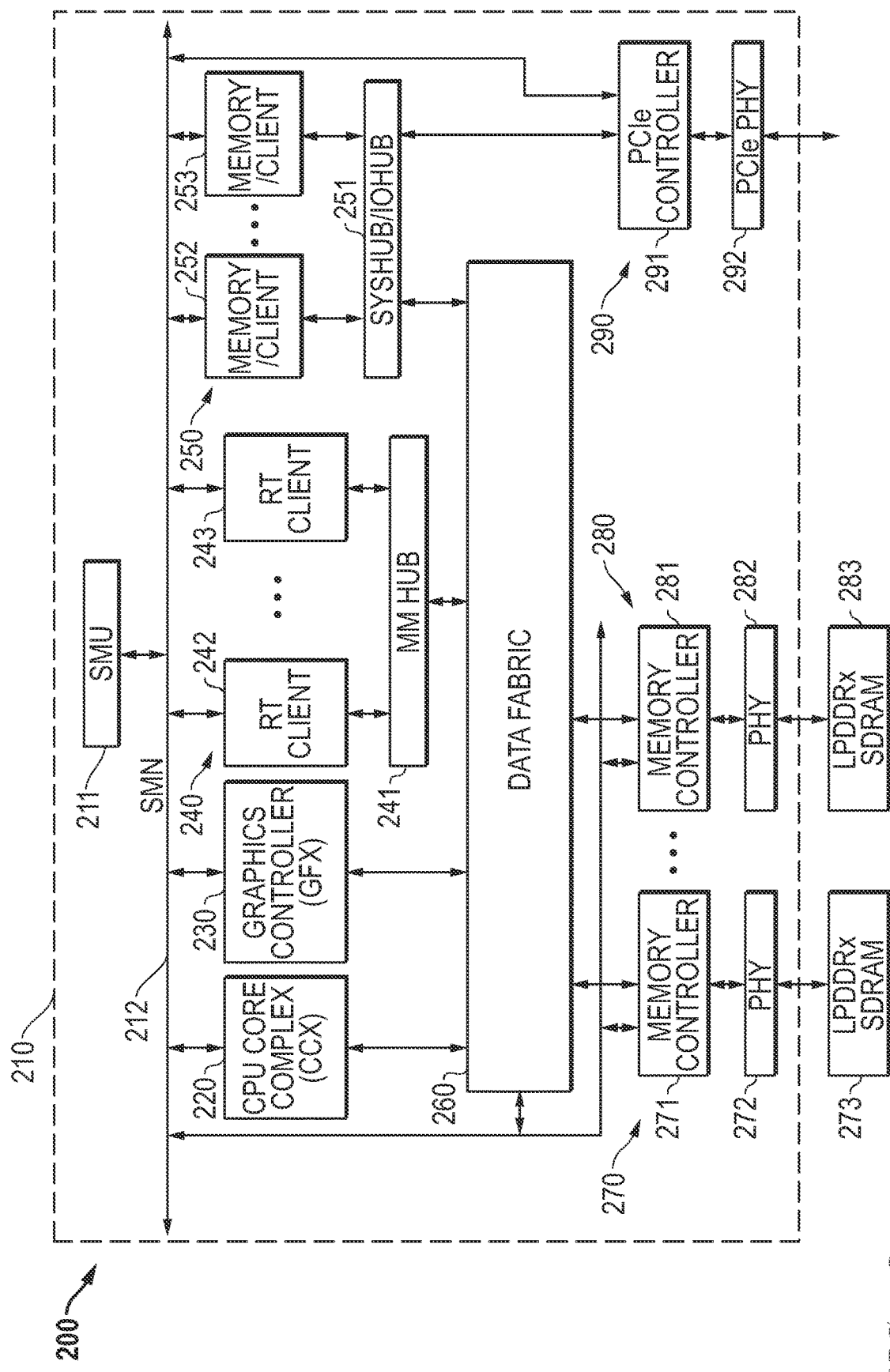
FIG. 2 illustrates in block diagram form a data processing system according to some embodiments.

FIG. 2 illustrates in block diagram form a data processing system 200 according to some embodiments. Data processing system 200 includes a data processor in the form of an SOC 210 and external memory in the form of low-power Double Data Rate synchronous dynamic random-access memories (LPDDRx SDRAMs) 273 and 283. Many other components of an actual data processing system are typically present but are not relevant to understanding the present disclosure and are not shown in FIG. 2 for ease of illustration.

SOC 210 includes generally a system management unit (SMU) 211, a system management network (SMN) 212, a central processing unit (CPU) core complex 220 labelled "CCX", a graphics controller 230 labelled "GFX", a real-time client subsystem 240, a memory/client subsystem 250, a data fabric 260, memory channels 270 and 280, and a Peripheral Component Interface Express (PCIe) subsystem 290. As will be appreciated by a person of ordinary skill, SOC 210 may not have all of these elements present in every embodiment and, further, may have additional elements included therein.

SMU 211 is bidirectionally connected to the major components in SOC 210 over SMN 212. SMN 212 forms a control fabric for SOC 210. SMU 211 is a local controller that controls the operation of the resources on SOC 210 and synchronizes communication among them. SMU 211 manages power-up sequencing of the various processors on SOC 210 and controls multiple off-chip devices via reset, enable and other signals. SMU 211 includes one or more clock sources (not shown), such as a phase locked loop (PLL), to provide clock signals for each of the components of SOC 210. SMU 211 also manages power for the various processors and other functional blocks, and may receive measured power consumption values from CPU cores in CPU core complex 220 and graphics controller 230 to determine appropriate P-states.

CPU core complex 220 includes a set of CPU cores, each of which is bidirectionally connected to SMU 211 over SMN 212. Each CPU core may be a unitary core only sharing a last-level cache with the other CPU cores, or may be combined with some but not all of the other cores in clusters.

Graphics controller 230 is bidirectionally connected to SMU 211 over SMN 212. Graphics controller 230 is a high-performance graphics processing unit capable of performing graphics operations such as vertex processing, fragment processing, shading, texture blending, and the like in a highly integrated and parallel fashion. In order to perform its operations, graphics controller 230 requires periodic access to external memory. In the embodiment shown in FIG. 2, graphics controller 230 shares a common memory subsystem with CPU cores in CPU core complex 220, an architecture known as a unified memory architecture. Because SOC 210 includes both a CPU and a GPU, it is also referred to as an accelerated processing unit (APU).

Real-time client subsystem 240 includes a set of real-time clients such as representative real time clients 242 and 243, and a memory management hub 241 labelled "MM HUB". Each real-time client is bidirectionally connected to SMU 211 over SMN 212, and to memory management hub 241. Real-time clients could be any type of peripheral controller that require periodic movement of data, such as an image signal processor (ISP), an audio coder-decoder (codec), a display controller that renders and rasterizes objects generated by graphics controller 230 for display on a monitor, and the like.

Memory/client subsystem 250 includes a set of memory elements or peripheral controllers such as representative memory/client devices 252 and 253, and a system and input/output hub 251 labeled "SYSHUB/IOHUB". Each memory/client device is bidirectionally connected to SMU 211 over SMN 212, and to system and input/output hub 251. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 260 is an interconnect that controls the flow of traffic in SOC 210. Data fabric 260 is bidirectionally connected to SMU 211 over SMN 212, and is bidirectionally connected to CPU core complex 220, graphics controller 230, memory management hub 241, system and input/output hub 251. Data fabric 260 includes a crossbar switch for routing memory-mapped access requests and responses between any of the various devices of SOC 210. It includes a system memory map, defined by a basic input/output system (BIOS), for determining destinations of memory accesses based on the system configuration, as well as buffers for each virtual connection.

Memory channels 270 and 280 are circuits that control the transfer of data to and from external memories 273 and 283. Memory channel 270 is formed by a memory controller 271 and a physical interface circuit 272 labelled "PHY" connected to external memory 273. Memory controller 271 is bidirectionally connected to SMU 211 over SMN 212 and has an upstream port bidirectionally connected to data fabric 260, and a downstream port. Physical interface circuit 272 has an upstream port bidirectionally connected to memory controller 271, and a downstream port bidirectionally connected to external memory 273. Similarly, memory channel 280 is formed by a memory controller 281 and a physical interface circuit 282 connected to external memory 283. Memory controller 281 is bidirectionally connected to SMU 211 over SMN 212 and has an upstream port bidirectionally connected to data fabric 260, and a downstream port. Physical interface circuit 282 has an upstream port bidirectionally connected to memory controller 281, and a downstream port bidirectionally connected to external memory 283.

Peripheral Component Interface Express (PCIe) subsystem 290 includes a PCIe controller 291 and a PCIe physical interface circuit 292. PCIe controller 291 is bidirectionally connected to SMU 211 over SMN 212 and has an upstream port bidirectionally connected to system and input/output hub 251, and a downstream port. PCIe physical interface circuit 292 has an upstream port bidirectionally connected to PCIe controller 291, and a downstream port bidirectionally connected to a PCIe fabric, not shown in FIG. 2. PCIe controller is capable of forming a PCIe root complex of a PCIe system for connection to a PCIe network including PCIe switches, routers, and devices.

In operation, SOC 210 integrates a complex assortment of computing and storage devices, including CPU core complex 220 and graphics controller 230, on a single chip. Most of these controllers are well-known and will not be discussed further. SOC 210 also implements various system monitoring and power saving functions, including P-state elevation and throttling and C-state entry and exit under the control of SMU 211 and/or operating system software.

For example, SOC 210 controls entry into and exit from various idle states of CPU core complex 220 and graphics controller 230 based on idle periods in which no instructions are executing. As is known, when CPU core complex 220 and graphics controller 230 all enter idle states, other components of SOC 210 can also be placed into appropriate idle states to save power. In one example, CPU core complex 220 supports two idle states including a shallow idle state (C1) and a deep idle state (C6) state. According to the ACPI mode, the C1 state is the lightest C-state and may merely involve clock gating and a reduction in power supply voltage that allows SOC 210 to retain its state but also to return to an active state with very low latency. On the other hand, the C6 state is a very deep C-state and reduces power consumption by gating clock signals and power supply voltage, but it also has a very a long exit latency. Since the expected residency in the C6 state can be, for example, on the order of tens of microseconds, it still provides net power savings despite longer entry and exit latencies.

In some known systems, other components of SOC 210 may also be placed in various idle states to correspond to the idle states of the data processing elements. In one particular example, when each CPU and the GPU enter the C1 state, the data fabric and memory system remain fully operational, but consume significant power when they are generally not needed. When each CPU and the GPU enter the C6 state, however, data fabric 260 is also placed into a corresponding idle power state with power and clock gating. Before the data fabric enters this idle power state, it places the external memory into the self-refresh state and places the memory controller and PHY into a similar low-power state.

However, the exit latency from this data fabric idle power state is problematical in SOCs with real-time client controllers. For example, the exit latency is determined by the phase locked loop power up time, the memory self refresh exit time, and the data fabric state restore time. This exit latency is too long to accommodate most peripheral controllers with reasonable buffer sizes.

In order to overcome this problem, the inventors have developed a new, "light-weight" C-state for data fabric 260 with an exit latency of, for example, approximately one tenth of the exit latency of the traditional data fabric idle power state. The smaller exit latency allows the peripheral controllers to be constructed with reasonable buffer sizes. The inventors have also developed new techniques for invoking this light-weight C-state and each one of these techniques improves the tradeoff between power reduction and exit latency that is useful in complex SOCs.

Figure 3:
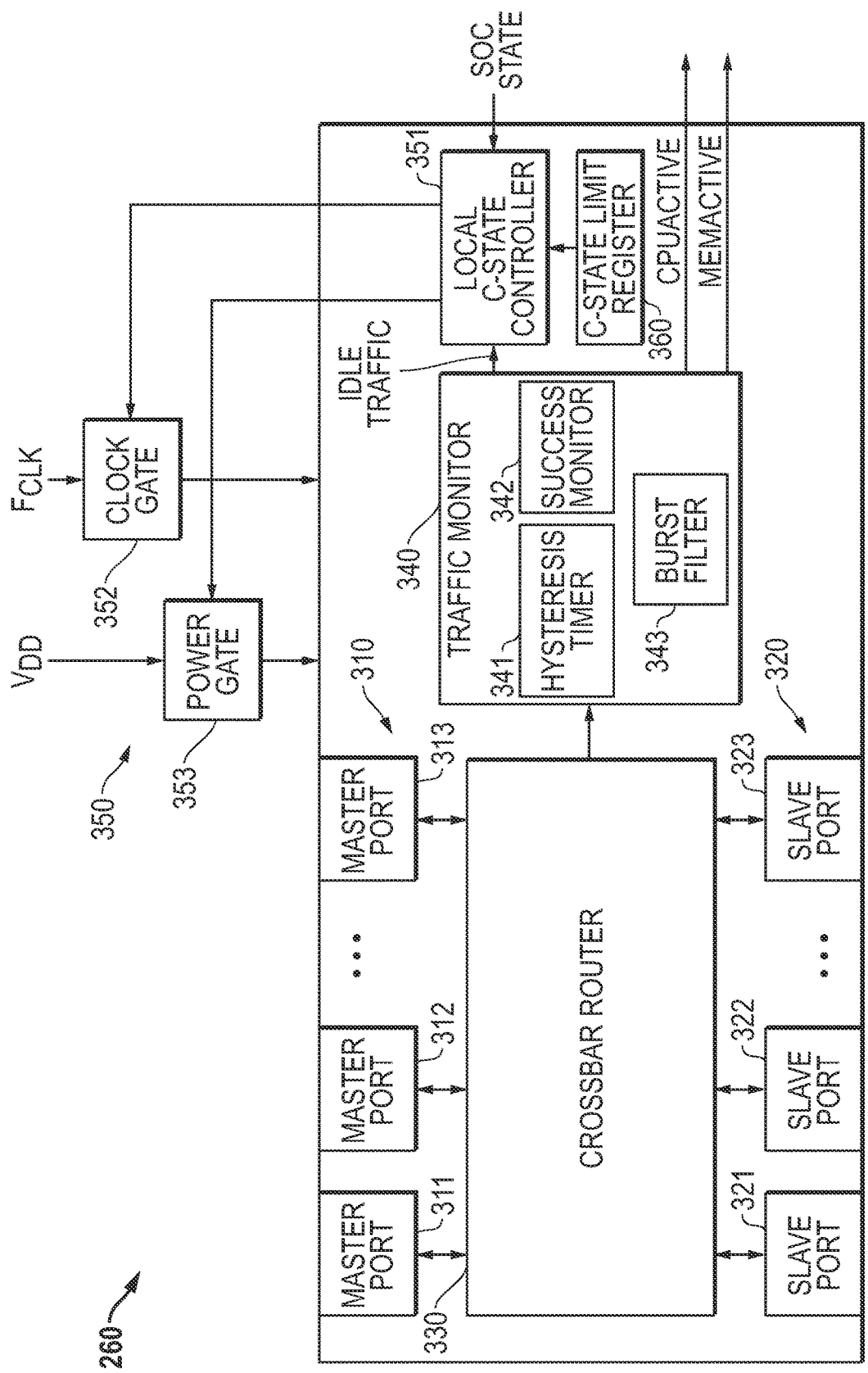
FIG. 3 illustrates in block diagram form the data fabric of FIG. 2 according to some embodiments.

FIG. 3 illustrates in block diagram form data fabric 260 of FIG. 2 according to some embodiments. Data fabric 260 includes a set of master ports 310, a set of slave ports 320, a crossbar router 330, a traffic monitor 340, a power controller circuit 350, and a C-state limit register.

Master ports 310 include ports for each device capable of generating memory access requests including representative master ports 311, 312, and 313. Each of master ports 311, 312, and 313 is adapted to be bidirectionally connected to a corresponding requesting device as shown in FIG. 2, and has a bidirectional downstream port. Each master port has an internal FIFO buffer for temporarily storing accesses.

Slave ports 320 include ports for each device capable of responding to memory access requests include representative slave ports 321, 322, and 323. Each of slave ports 321, 322, and 323 has a bidirectional upstream port and is adapted to be bidirectionally connected to a corresponding responding device as shown in FIG. 2. Each slave port has an internal FIFO buffer for temporarily storing accesses.

Crossbar router 330 has bidirectional connections to the downstream bidirectional connections of master ports 310 and bidirectional connections to the upstream bidirectional connections of slave ports 320. Crossbar router 330 is the heart of data fabric 260 and forms virtual connections between masters and slaves based on the destination addresses of the requestors by routing access between a master port and a corresponding slave port.

Traffic monitor 340 has an input coupled to crossbar router 330, and an output for providing a signal labeled "IDLE TRAFFIC", an output for providing a signal labelled "CPU ACTICE", and an output for providing a signal labelled "MEMACTIVE". Traffic monitor 340 includes a hysteresis timer 341, a success monitor circuit 342, and a burst filter 343.

Power controller circuit 350 includes a local C-state controller 351, a clock gate circuit 352, and a power gate circuit 353. Local C-state controller 351 has a first input for receiving the IDLE TRAFFIC signal, a second input for receiving a signal labelled "SOC STATE", a third input, and first and second outputs. Clock gate circuit 352 has an input for receiving a data fabric clock signal labelled "$F_{CLK}$", a control input connected to the first output of local C-state controller 351, and an output for providing a selectively gated clock signal to data fabric 260. Power gate circuit 353 has an input for receiving a data fabric power supply voltage labelled "$V_{DD}$", a control input connected to the second output of local C-state controller 351, and an output for providing a selectively gated power supply voltage to data fabric 260.

C-state limit register 360 has an output connected to the third input of local C-state controller 351. It is shown as being part of data fabric 260, but in other embodiments could be part of another block of SOC 210.

Generally, data fabric 260 routes memory access requests and responses between requestors (such a CPU core, the GPU, a real-time client controller, and the like) and responders (such as external memory through the memory controllers and PHYs, an on-chip memory, and the like). Local C-state controller activates clock gate 352 to inhibit the passage of the clock signal $F_{CLK}$ while keeping power gate 353 inactive in the light weight C-state, and activates both clock gate 352 and power gate 353 in the traditional C-state. In addition, it may perform additional steps not shown in FIG. 3, such as disabling a phase locked loop that generates fabric clock signal $F_{CLK}$ when entering the traditional C-state.

Data fabric 260 implements two new low-power idle techniques. The first technique is known as disconnect monitoring. Using the first technique, data fabric 260 monitors traffic through data fabric 260 and autonomously places the data fabric in the light-weight C-state in response to detecting an idle traffic state without the intervention of SMU 211. In particular, traffic monitor 340 detects the absence of traffic through crossbar router 330 and activates the IDLE TRAFFIC signal in response. In some embodiments, traffic monitor 340 detects the idle traffic condition by detecting a disconnect condition for each master port that is connected to a non-stuttering client and for each slave port. A non-stuttering client is a client that attempts to empty its outgoing buffer and/or fill its incoming buffer as soon as any entries are present. On the other hand, a stuttering client is a client that gathers a certain number of memory access requests before attempting to send them in one burst.

In the illustrated embodiment, to detect the idle traffic condition, traffic monitor 340 further uses a success monitor circuit 342 that detects the disconnect condition in response to either the data ports being idle for a period of time determined by hysteresis timer 341, or a prediction that a next traffic idle period will last longer than a threshold. Success monitor circuit 342 works in conjunction with burst filter 343 to filter "noisy" traffic that lasts for only a short duration after traffic resumes, and thereby to avoid a distortion in the next traffic idle prediction.

The second technique is known as C-state limit. Using the C-state limit function, data fabric 260 is prevented from entering the traditional C-state in response to the CPU cores and GPU entering the C6 state, and instead is forced to enter the light-weight C-state. In the particular embodiment of this technique shown in FIG. 3, data fabric 260 is responsive to the SOC STATE signal to enter the traditional C-state. However, C-state limit register 360 includes a C-state limit bit to cause local C-state controller 351 to enter the light-weight C-state instead of the traditional C-state in response to the SOC STATE signal indicating that all CPU cores and the GPU have entered the C6 state.

In the embodiment shown in FIG. 3, the C-state limit function is determined by one bit in a register associated with data fabric 260, but in other embodiments the C-state limit function can be decentralized and invoked individually by each client of the data fabric. In one example, the BIOS or operating system can set the C-state limit bit after enumerating the system at power up. In another example, various device drivers and firmware can invoke the C-state limit. In another embodiment, the operating system can invoke the C-state limit dynamically in low latency conditions, such as when a real-time client is in a stutter mode.

FIG. 4 illustrates a table 400 showing the correspondence between different data fabric idle states and the states of other components of SOC 210 of FIG. 2. Table 400 includes a first row describing a "light-weight" C-state 410 for data fabric 260 labelled "DFC1", and a second row 420 describing a "traditional" C-state 420 for data fabric 260 labelled "DFC2". Chart 400 includes six columns including a "C-state" column, a memory controller column labelled "UMC", a physical interface controller column labelled "PHY", a memory column labelled "DRAM", and a clock column labelled "CLK" in which the CLK refers to the data fabric's and memory controller's respective clock sources, which can be the same or different.

DFC2 corresponds a traditional C-state in which both the power and clock are gated for data fabric 260. Since DFC2 requires significant wake-up latency for data fabric 260, DFC2 also performs power and clock gating for the data fabric and memory controller, and additionally places the memory PHY into a low power state with its PLL off, a state designated LP2. Before power- and clock-gating these components, however, the memory is placed into self-refresh mode to preserve its contents during the expected long residency in DFC2. In addition, the data fabric's and memory controller's PLL(s) is powered down and the output is bypassed to the reference clock REFCLK.

As noted above, data fabric 260 adds a new, lightweight C-state DFC1. To reduce wakeup latency to accommodate, e.g., real-time peripherals, DFC1 only clock gates data fabric 260 and the memory controller's clock source(s), and additionally keeps the memory PHY powered on with the data fabric's and memory controller's PLL(s) remaining locked. Before clock-gating these components, however, the memory is placed into self-refresh mode to preserve its contents during an indeterminate residency in DFC1, and the data fabric's and memory controller's PLL(s) is not powered off but placed into the lower latency deep sleep mode.

Thus, the data fabric provides a lightweight idle state DFC1 that provides lower latency to allow real-time peripherals, such as an image sensor processor, the ability to periodically access the memory system.

Figure 5:
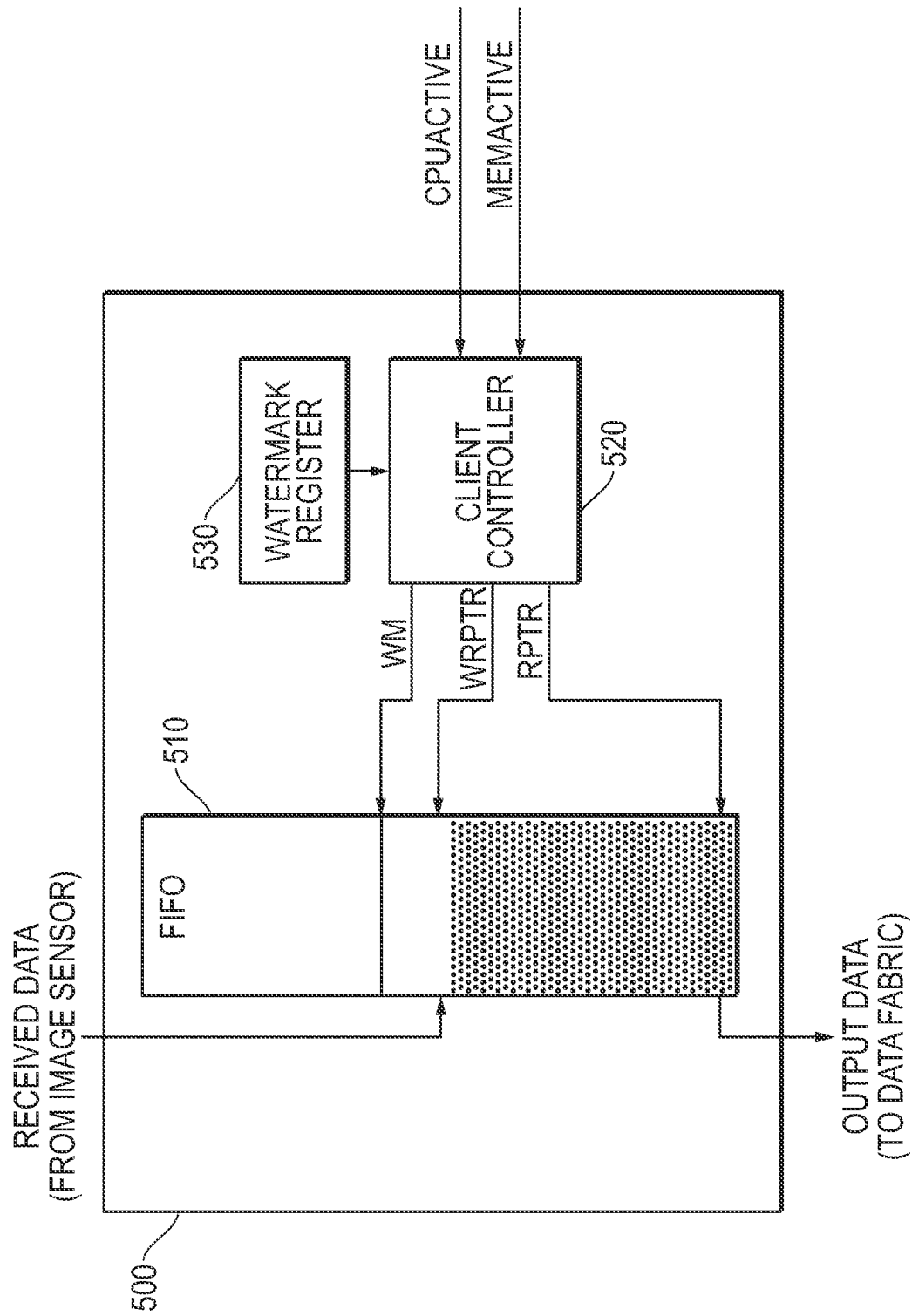
FIG. 5 illustrates in block diagram form an image sensor processor (ISP) having a buffer for storing data according to some embodiments.

FIG. 5 illustrates in block diagram form an image sensor processor (ISP) 500 having a buffer 510 for storing data according to some embodiments. In addition to buffer 510, ISP 500 also includes a client controller 520 and a watermark register 530.

Buffer 510 is a first-in, first-out (FIFO) buffer that is shown as a push-down FIFO for simplicity. In a push-down FIFO, incoming data received from an external image sensor is placed on the top of FIFO and outgoing data is pulled from the bottom of the FIFO, after which the valid data is shifted downward by one position. In some actual embodiments, the pointers will wrap around and the amount of data in the FIFO is the number of entries between the read pointer and the write pointer.

Client controller 520 has a first input for receiving the CPUACTIVE signal, a second input for receiving the MEMACTIVE signal, a third input, and outputs for providing a read pointer labelled "RPTR", a write pointer labelled "WPTR", and a watermark level indicator labelled "WM".

Watermark register 530 has an output for providing a watermark level. Watermark register 530 is also writable using a mechanism not shown in FIG. 5. In one embodiment, watermark register 530 could be a model specific register (MSR), and an operating system running in privileged mode could program it at according to the idle state of SOC 210 or any relevant portion thereof, such as the idle state of data fabric 260.

ISP 500 supports a third low-power idle technique known as input/output (I/O) stutter that operates in conjunction with the light-weight C-state of data fabric 260. ISP 500 has a normal request mode and a stutter mode. In the normal request mode, ISP 500 transfers data between buffer 510 and a responder through data fabric 260 without regard to the watermark. In data processing system 200, the responder could be, for example, one of memory channels 270 or 280 or PCIe subsystem 290. In the stutter mode, however, it implements a burst policy to transfer data between buffer 510 and the appropriate responder only in response to crossing the watermark.

According to the I/O stutter technique, ISP 500 selectively enters the stutter mode in response to the activity detected by data fabric 260 to support the data fabric residency in the lightweight C-state. Data fabric 260 broadcasts the CPUACTIVE and MEMACTIVE signals on sideband channels. See TABLE I:

TABLE I

| CPUACTIVE | MEMACTIVE | Description |
|---|---|---|
| 1 | X | CPU cores are active. ISP 500 is in normal request mode, and watermark ignored. |
| 0 | 1 | ISP 500 is in stutter mode. ISP 500 starts burst when buffer reaches watermark or on a transition to this state to align with other clients. |
| 0 | 0 | ISP 500 is in stutter mode, and burst will only be started when buffer reaches watermark |

The much shorter transition latency of the light-weight C-state allows ISP 500 stutter with reasonable buffer sizing. Furthermore, ISP 500 can coordinate with other I/O stutter-capable clients in order to align its stutter phase with the other I/O stutter-capable clients. Because it has a shorter expected residency than the normal C-state. Placing the requestor (e.g., ISP 500) into stutter mode allows a longer residence suitable for the light-weight C-state without creating activity that would bring the data fabric 260 out of the light-weight C-state upon detection of the bus activity.

Moreover, data fabric 260 can determine whether to enter a normal C-state or the lightweight C-state in response to the SOC state signal based on whether the requestors are in stutter mode.

SOC 210 of FIG. 2 or any portions thereof, such as data fabric 260, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, a variety of peripheral controller circuits besides the disclosed image sensor processor can support stutter mode. The various techniques used in conjunction with the light-weight C-state for the data fabric disclosed herein can be used independently or in conjunction with the other techniques. Moreover, different techniques and circuits can be used to detect the idle traffic state through the data fabric.

Accordingly, it is intended by the appended claims to cover all modifications of the disclosed embodiments that fall within the scope of the disclosed embodiments.

What is claimed is:

1. A data processor comprising:
   a plurality of requestors;
   a plurality of responders; and
   a data fabric for routing requests between said plurality of requestors and said plurality of responders and having a plurality of non-operational power states including a normal C-state and a light-weight C-state, wherein said light-weight C-state has lower entry and exit latencies than said normal C-state,
   wherein said data fabric monitors traffic through said data fabric and places said data fabric in said light-weight C-state in response to detecting an idle traffic state, and
   wherein said data fabric comprises a crossbar switch.

2. The data processor of claim 1, wherein said data fabric comprises:
   a plurality of data ports; and
   a traffic monitor circuit that detects a disconnect condition for each of said plurality of data ports that are connected to non-stuttering clients, wherein said data fabric enters said light-weight C-state in response to said disconnect condition.

3. The data processor of claim 2, wherein said traffic monitor circuit comprises:
   a hysteresis timer; and
   a success monitor circuit coupled to said hysteresis timer that detects said disconnect condition in response to either said plurality of data ports being idle until an expiration of said hysteresis timer, or a prediction that a next traffic idle period will last longer than a threshold.

4. The data processor of claim 3, wherein said traffic monitor circuit further comprises:
   a burst filter circuit coupled to said success monitor circuit for causing said success monitor circuit to filter noisy traffic for a short duration after traffic resumes, thereby avoiding a distortion in said prediction.

5. The data processor of claim 1, wherein:
   said plurality of requestors includes a central processing unit core complex, wherein said central processing unit core complex selectively prevents said data fabric from entering said light-weight C-state in response to detection of one of active and imminent request traffic to said data fabric.

6. The data processor of claim 1, wherein:
   said data fabric consumes less power in said normal C-state than in said light-weight C-state.

7. The data processor of claim 1, wherein:
   said data fabric continues to receive power while gating a clock input signal in said light-weight C-state, and gates both power and said input clock signal in said normal C-state.

8. The data processor of claim 1, wherein:
   said data fabric is adapted to enter said normal C-state in response to a predetermined state of the data processor, and
   said data fabric is programmable to enter said light-weight C-state instead of said normal C-state in response to said predetermined state.

9. A data processor comprising:
   a plurality of requestors including a first requestor;
   a plurality of responders including a first responder; and
   a data fabric for routing requests between said first requestor and said first responder and having a plurality of non-operational power states including a normal C-state and a light-weight C-state, wherein said light-weight C-state has lower entry and exit latencies than said normal C-state, wherein said data fabric is adapted to enter said normal C-state in response to a predetermined state of the data processor, said data fabric is programmable to enter said light-weight C-state instead of said normal C-state in response to the data processor not being in said predetermined state of the data processor and to monitoring traffic through said data fabric and detecting an idle traffic condition, and wherein said data fabric comprises a crossbar switch.

10. The data processor of claim 9, wherein:
said data fabric is further operable to route requests between a selected one of said plurality of requestors and a selected one of said plurality of responders.

11. The data processor of claim 9, wherein said data fabric comprises:
a controller for placing said data fabric into said normal C-state; and
a programmable C-state limit register that in a first state allows said data fabric to enter said normal C-state in response to said predetermined state of the data processor, and in a second state causes said data fabric to enter said light-weight C-state instead of said normal C-state in response said predetermined state of the data processor.

12. The data processor of claim 9, wherein:
said data fabric continues to receive power while gating a clock input signal in said light-weight C-state, and gates both power and said input clock signal in said normal C-state.

13. The data processor of claim 9, wherein:
said first responder comprises:
  a memory controller coupled to a slave port of said data fabric; and
  a physical interface circuit coupled to said memory controller and adapted to be coupled to an external memory,
wherein in response to said data fabric entering said light-weight C-state, the data processor causes the memory controller to enter a first non-operational power state and said physical interface circuit to enter a second non-operational power state; and
wherein in response to said data fabric entering said normal C-state, the data processor causes the memory controller to enter a third non-operational power state and said physical interface circuit to enter a fourth non-operational power state.

14. The data processor of claim 13, wherein:
said first non-operational power state comprises a clock gated state, and said third non-operational power state comprises a clock- and power-gated state.

15. The data processor of claim 13, wherein:
said second non-operational power state comprises a powered-on and phase locked-loop locked state, and said fourth non-operational power state comprises a low-power and phase locked-loop off state.

16. The data processor of claim 13, wherein:
said memory controller causes said external memory into a self-refresh state in response to entering either said light-weight C-state or said normal C-state.

17. A data processor comprising:
a plurality of requestors;
a plurality of responders; and
a data fabric for routing requests between said plurality of requestors and said plurality of responders,
wherein at least one requestor of said plurality of requestors comprises a buffer and selectively transfers data between said buffer and at least one responder through said data fabric, and has a stutter mode in which it implements a burst policy to transfer data between said buffer and one of said at least one responder in response to crossing a watermark, and
wherein said data fabric includes a power management controller for controlling said data fabric to implement a plurality of non-operational power states including a normal C-state and a light-weight C-state by monitoring traffic through said data fabric and detecting an idle traffic condition, and disables implementing said normal C-state in response to each of said at least one requestor operating in said stutter mode, and
wherein said data fabric comprises a crossbar switch.

18. The data processor of claim 17, wherein said at least one requestor includes a client controller that places a corresponding requestor into said stutter mode in response to a central processing unit being inactive and a memory being active.

19. The data processor of claim 18, wherein said client controller places said corresponding requestor into a normal request mode in response to said central processing unit being active, wherein in said normal request mode, said corresponding requestor transfers data between said buffer and said at least one responder without regard to said watermark.

20. The data processor of claim 17, wherein:
said data fabric has lower entry and exit latency in said light-weight C-state; and
said data fabric consumes less power in said normal C-state than in said light-weight C-state.

21. The data processor of claim 17, wherein:
said data fabric continues to receive power while gating a clock input signal in said light-weight C-state, and gates both power and said input clock signal in said normal C-state.

* * * * *